United States Patent
Li et al.

(10) Patent No.: US 10,187,162 B2
(45) Date of Patent: Jan. 22, 2019

(54) FREE SPACE COMMUNICATION

(71) Applicant: Nokia Technologies Oy, Espoo (FI)

(72) Inventors: Hongwei Li, Cambridge (GB); David Bitauld, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/508,061

(22) PCT Filed: Sep. 4, 2014

(86) PCT No.: PCT/FI2014/050676
§ 371 (c)(1),
(2) Date: Mar. 1, 2017

(87) PCT Pub. No.: WO2016/034758
PCT Pub. Date: Mar. 10, 2016

(65) Prior Publication Data
US 2017/0288784 A1    Oct. 5, 2017

(51) Int. Cl.
*H04B 10/69*       (2013.01)
*H04B 10/114*      (2013.01)
(Continued)

(52) U.S. Cl.
CPC ........... *H04B 10/691* (2013.01); *G02B 26/08* (2013.01); *G02B 26/10* (2013.01); *G02B 27/30* (2013.01);
(Continued)

(58) Field of Classification Search
None
See application file for complete search history.

(56) References Cited

U.S. PATENT DOCUMENTS

| 5,790,291 A | 8/1998 | Britz |
| 6,381,055 B1 | 4/2002 | Javitt et al. |

(Continued)

FOREIGN PATENT DOCUMENTS

| JP | 2001292105 A | 10/2001 |
| JP | 2008053849 A | 3/2008 |

(Continued)

OTHER PUBLICATIONS

International Search Report and Written Opinion received for corresponding Patent Cooperation Treaty Application No. PCT/FI2014/050676 dated Feb. 24, 2015, 17 pages.

(Continued)

*Primary Examiner* — Darren E Wolf
(74) *Attorney, Agent, or Firm* — Alston & Bird LLP (57) ABSTRACT

According to an example aspect of the present invention, there is provided an apparatus (201) comprising adjustable optical equipment (290), a position sensitive photodetector (280), at least one light emitter (220), and control circuitry (104) configured to cause the light emitter (220) and the adjustable optical equipment (290) to output from the apparatus (201) a divergent beam of light, to determine a location of a light signal on the position sensitive photodetector (280) and to cause at least one of the at least one light emitter (220) and the adjustable optical equipment (290) to output from the apparatus (201) a collimated beam of light to a direction selected based at least in part on the location of the light signal on the position sensitive photodetector (280).

16 Claims, 8 Drawing Sheets

(51) Int. Cl.
  *H04B 10/40* (2013.01)
  *H04B 10/50* (2013.01)
  *G02B 26/08* (2006.01)
  *G02B 26/10* (2006.01)
  *G02B 27/30* (2006.01)
  *H04B 10/70* (2013.01)
  *G02B 5/12* (2006.01)
  *H04L 9/08* (2006.01)

(52) U.S. Cl.
  CPC ........... *H04B 10/114* (2013.01); *H04B 10/40* (2013.01); *H04B 10/503* (2013.01); *H04B 10/70* (2013.01); *G02B 5/12* (2013.01); *H04L 9/0852* (2013.01)

(56) References Cited

U.S. PATENT DOCUMENTS

| | | | |
|---|---|---|---|
| 6,658,214 | B1 | 12/2003 | Ito |
| 6,970,651 | B1 | 11/2005 | Schuster et al. |
| 7,324,647 | B1 | 1/2008 | Elliott |
| 8,275,911 | B1 | 9/2012 | Gough |
| 2002/0081060 | A1 | 6/2002 | Margalit et al. |
| 2003/0035182 | A1* | 2/2003 | Sidorovich ........ H04B 10/1149 398/126 |
| 2004/0075880 | A1 | 4/2004 | Pepper et al. |
| 2005/0069325 | A1 | 3/2005 | Cicchiello et al. |
| 2007/0031151 | A1 | 2/2007 | Cunningham |
| 2010/0054755 | A1 | 3/2010 | Kwon et al. |
| 2012/0039617 | A1 | 2/2012 | Duligall et al. |
| 2013/0082162 | A1 | 4/2013 | Eide |

FOREIGN PATENT DOCUMENTS

| | | |
|---|---|---|
| WO | WO 2014/155149 A1 | 10/2014 |
| WO | WO 2014/184616 A1 | 11/2014 |
| WO | WO 2015/116112 A1 | 8/2015 |

OTHER PUBLICATIONS

Garcia, M. J. et al. "High-Speed Free-Space Quantum Key Distribution System for Urban Applications". In Proceedings of Reunion Espanola sobre Criptologia y Seguridad de la Informacion (RECSI 2010) 2010 pp. 333-336, chapters 2, 3, 5; figs. 1-4.

Extended European Search Report for Application No. EP 14 90 1200 dated Apr. 5, 2018, 10 pages.

Shen, T. C. et al., *Design of Dual-Link (Wide- and Narrow-Beam) LED Communication Systems*, Optics Express, vol. 22, No. 9, (May 1, 2014) 11107-11118.

F-Theta Scan Lenses [online] [retrieved Apr. 27, 2018]. Retrieved from the Internet: <URL: https://www.thorlabs.de/newgrouppage9.cfm?objectgroup_id=6430>. (undated) 4 pages.

Retroreflector—Wikipedia [online] [retrieved Apr. 26, 2018]. Retrieved from the Internet: <http://en.wikipedia.org/wiki/Retroreflector>. Directed to: https://en.wikipedia.org/wiki/Retroreflector>. (undated) 12 pages.

Retroreflector Prisms [online] [retrieved Apr. 27, 2018]. Retrieved from the Internet: <URL: https://www.thorlabs.de/newgrouppage9.cfm?objectgroup_id=145>. (dated Aug. 12, 2013) 4 pages.

* cited by examiner

FREE SPACE COMMUNICATION

RELATED APPLICATION

This application was originally filed as Patent Cooperation Treaty Application No. PCT/FI2014/050676 filed Sep. 4, 2014.

FIELD OF INVENTION

The present invention relates to communicating information wirelessly over a free space.

BACKGROUND OF INVENTION

Many modern electronic devices connect to other electronic devices in order to share data. Some data connections are wired via a cable with connectors on each end that couple with connectors in the electronic devices to share data between the devices. Some data connections are wireless allowing a data connection between devices that does not require a cable. Electronic devices that require data to be shared include a wide variety of consumer and industrial products including mobile devices such as cell phones, handheld computing devices, laptops, and the like. As the features and capabilities available in mobile devices have increased, the need for higher throughput data connections has also increased. For example, high-definition video captured on a mobile device and sent via a data connection to another device requires a high-throughput data connection.

Wired, or cable, connections may comprise Ethernet or universal serial bus, USB, connections, for example. Wireless communications may comprise radio communications, or optical communication, for example. Examples of radio communications comprise short-wave radio communications and cellular communications, for example, Cellular communications may take place in accordance with a cellular standard, such as wideband code division multiple access, WCDMA, or long term evolution, LTE, for example. Optical communications may comprise infrared or laser communications, for example.

Communicated information may be encrypted using an encryption algorithm. Encryption keys may be communicated using a secure method, such as for example an out of band channel, public-key cryptography or single-photon communication, for example. Once encryption keys have been exchanged, or established, between communication endpoints a symmetric encryption algorithm may be employed to secure information communicated between the communication endpoints during that session.

A suitable secure method for communicating encryption keys may be spaced based on characteristics of the application. For example, diplomatic missions may employ out-of-band communication using legally protected diplomatic correspondence. Communication nodes interconnected with high-quality optic fibres may be able to use single photon communication over the fibres. Internet commerce may rely on public-key cryptography.

SUMMARY OF THE INVENTION

According to a first aspect of the present invention, there is provided an apparatus comprising adjustable optical equipment, a position sensitive photodetector, at least one light emitter, and control circuitry configured to cause the light emitter and the adjustable optical equipment to output from the apparatus a divergent beam of light, to determine a location of a light signal on the position sensitive photodetector and to cause at least one of the at least one light emitter and the adjustable optical equipment to output from the apparatus a collimated beam of light to a direction selected based at least in part on the location of the light signal on the position sensitive photodetector.

Various embodiments of the first aspect may comprise at least one feature from the following bulleted list:

- the adjustable optical equipment comprises an adjustable mirror and/or an adjustable lens. For example, the mirror may be tiltable. For example, the lens may be movable along a linear axis.
- the light signal is focused on the position sensitive photodetector by a lens system comprised in the apparatus. The lens system may comprise, for example, at least one lens.
- the light emitter comprises a laser diode
- the light signal comprises a reflection of the divergent beam of light. The direction of arrival of the reflection may indicate a direction where a corresponding transceiver is to be found. The reflection may comprise a retroreflection.
- the apparatus further comprises a beam splitter arranged to direct outgoing light from the adjustable mirror to a first direction, and to admit light arriving from the first direction to proceed toward the position sensitive photodetector. The light from the first direction may proceed toward the position sensitive photodetector through the lens system.
- the apparatus further comprises a beam splitter arranged between the lens system and the position sensitive photodetector, arranged to cause light from the lens system to illuminate the position sensitive photodetector and a second photodetector
- the adjustable mirror is arranged to reflect light arriving from the adjustable lens to a first direction, and light arriving from the first direction, arriving at the apparatus, in part passes the adjustable mirror to proceed toward the position sensitive photodetector
- the at least one light emitter comprises a quantum key emitter configured to transmit optically encoded key information in the collimated beam of light, via the adjustable optical equipment.

According to a second aspect of the present invention, there is provided an apparatus comprising an optical receiver comprising a position sensitive photodetector configured to determine a determine a location of a light signal thereon, and a tilt actuator mechanism configured to tilt the optical receiver based at least in part on the location of the light signal on the position sensitive photodetector.

Various embodiments of the second aspect may comprise at least one feature from the following bulleted list:

- the optical receiver may further comprise a retroreflector configured to reflect incoming light back toward its origin
- the apparatus may further comprise a light emitter configured to emit light from the apparatus to enable line-of-sight optical communication
- the optical receiver may further comprise a quantum receiver configured to receive quantum key information encoded in light arriving in the optical receiver
- the optical receiver may further comprise a beam splitter arranged to direct a first part of the incoming light to the retroreflector and a second part of the incoming light to the position sensitive photodetector.

According to a third aspect of the present invention, there is provided an apparatus comprising: an optical receiver comprising a retroreflector configured to reflect incoming light back toward its origin, and a quantum receiver configured to receive quantum key information encoded in incoming light arriving in the optical receiver.

According to a fourth aspect of the present invention, there is provided a system comprising a first apparatus according to the first aspect and a second apparatus according to the second aspect, wherein the adjustable optical equipment of the first apparatus is adjustable quicker than the tilt actuator mechanism of the second apparatus.

According to a fifth aspect of the present invention, there is provided a method, comprising causing a light emitter and an adjustable optical equipment to output from an apparatus a divergent beam of light, determining a location of a light signal on a position sensitive photodetector, and causing the light emitter and the adjustable optical equipment to output from the apparatus a collimated beam of light to a direction selected based at least in part on the location of the light signal on the position sensitive photodetector.

Various embodiments of the fifth aspect may comprise at least one feature from the preceding bulleted list laid out in connection with the first aspect.

According to a sixth aspect of the present invention, there is provided a method, comprising determining a location of a light signal on a position sensitive photodetector comprised in an optical transceiver, and tilting the optical transceiver based at least in part on the location of the light signal on the position sensitive photodetector.

Various embodiments of the sixth aspect may comprise at least one feature from the preceding bulleted list laid out in connection with the second aspect.

According to a seventh aspect of the present invention, there is provided an apparatus comprising means for causing a light emitter and an adjustable optical equipment to output from an apparatus a divergent beam of light, means for determining a location of a light signal on a position sensitive photodetector, and means for causing the light emitter and the adjustable optical equipment to output from the apparatus a collimated beam of light to a direction selected based at least in part on the location of the light signal on the position sensitive photodetector.

According to an eighth aspect of the present invention, there is provided an apparatus, comprising means for determining a location of a light signal on a position sensitive photodetector comprised in an optical transceiver, and means for tilting the optical transceiver based at least in part on the location of the light signal on the position sensitive photodetector.

According to a ninth aspect of the present invention, there is provided a non-transitory computer readable medium having stored thereon a set of computer readable instructions that, when executed by at least one processor, cause an apparatus to at least cause a light emitter and an adjustable optical equipment to output from an apparatus a divergent beam of light, determine a location of a light signal on a position sensitive photodetector, and cause the light emitter and the adjustable optical equipment to output from the apparatus a collimated beam of light to a direction selected based at least in part on the location of the light signal on the position sensitive photodetector.

According to a tenth aspect of the present invention, there is provided a non-transitory computer readable medium having stored thereon a set of computer readable instructions that, when executed by at least one processor, cause an apparatus to at least determine a location of a light signal on a position sensitive photodetector comprised in an optical transceiver, and tilt the optical transceiver based at least in part on the location of the light signal on the position sensitive photodetector.

According to an eleventh aspect of the present invention, there is provided a computer program configured to cause a method in accordance with at least one of the fifth and sixth aspects to be performed.

INDUSTRIAL APPLICABILITY

At least some embodiments of the present invention find industrial application in facilitating and/or enabling confidential communication of information over a free space interface.

DETAILED DESCRIPTION OF EXAMPLE EMBODIMENTS

A retroreflector on a server side enables a mobile side transceiver to find a direction toward a server quickly and adapt a directionality of light being emitted from the mobile based on determining a direction from where the reflection arrives in the mobile transceiver. A tilting mechanism on the server side enables the server side transceiver to receive signals from a wider angle. Configuring the mobile side to adapt at a different rate than the server side prevents harmful interactions in the adaptations on the mobile and server sides.

Figure 1:
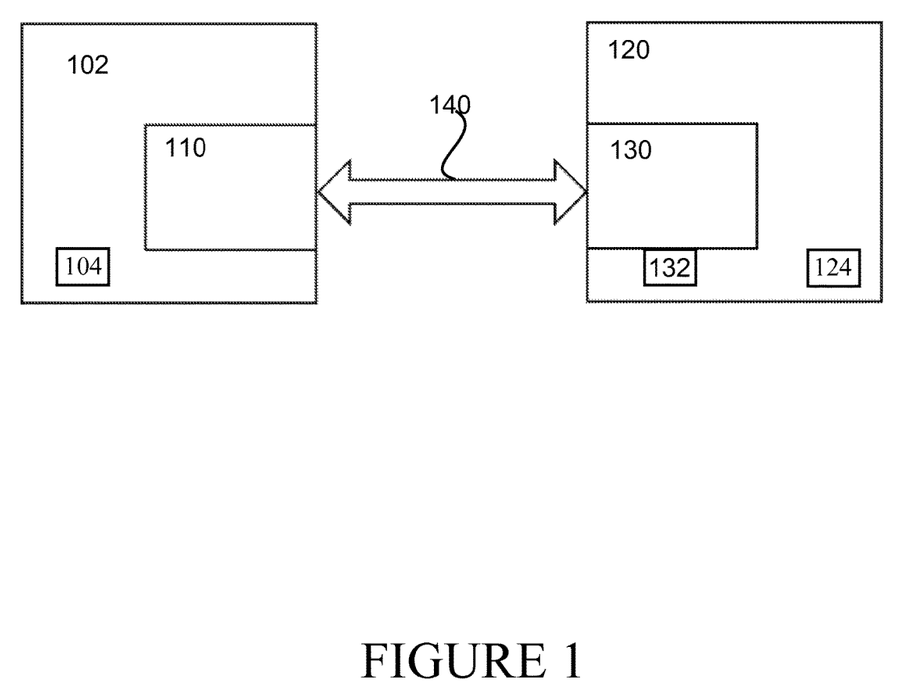
FIG. 1 illustrates an example system capable of supporting at least some embodiments of the present invention.

FIG. 1 illustrates an example system capable of supporting at least some embodiments of the present invention. The system comprises a mobile device 102. Mobile device 102 may comprise, for example, a cellular telephone, smartphone, tablet device, laptop computer, portable credit-card terminal or other device with suitable communicative capability. Mobile device 102 comprises an optical transceiver 110. Mobile device 102 may comprise control circuitry or processor 104, which may be configured to cause mobile device 102 and/or transceiver 110 to perform actions. Mobile device 102 may further comprise memory configured to store instructions arranged to be executed by control circuitry or processor 104. Control circuitry may comprise at least one processor, or be comprised in at least one processor as at least one processing core.

The illustrated system also comprises server 120, which may be stationary in nature. By stationary it is meant that the server does not move normally during use, not necessarily that it cannot be moved overall. Server 120 comprises an optical transceiver 130, which is mechanically connected to a tilt actuator mechanism 132, which is arranged to cause transceiver 130 to tilt with respect to at least one angular degree of freedom. Tilt actuator mechanism may be based on microelectromechanical, MEMS, actuation, electrical motors, hydraulic processes or other suitable mechanical actuating process or processes. Server 120 may comprise control circuitry or processor 124, which may be configured to cause server 120, tilt actuator mechanism 132 and/or transceiver 130 to perform actions. Server 120 may further comprise memory configured to store instructions arranged to be executed by control circuitry or processor 124.

Mobile device 102 and server 120 communicate over free space interface 140. Free-space interface 140 comprises a gas or vacuum through which light may pass largely unscattered.

In use, mobile device 102 may illuminate server 120 with light emitted from transceiver 110. This light may be visible light, for example. This light may comprise a divergent beam of light, to enable easy pointing of the light to illuminate server 120. A retroreflector in server 120, for example in transceiver 130, may be arranged to reflect light arriving in server 120 back toward the origin of this light. Transceiver 110 may be configured to detect this reflected light, arriving from the server, to determine the direction of arrival of the reflected light and to direct a beam of light from transceiver 110 toward the determined direction.

On the server side, transceiver 130 may be configured to determine the direction from where light from mobile device 102 arrives, and to tilt, using tilt actuator mechanism 132, transceiver 130 toward the determined direction. Thus server 120 may be enabled to participate in optical communication with devices that are not lined up with an initial receiving direction of transceiver 130. As server 120 may be stationary, that it, not actively pointed by a user toward a mobile device a tiltable transceiver may enable a wider angle, or larger solid angle, for communicating with devices such as, for example, mobile device 102.

Figure 2:
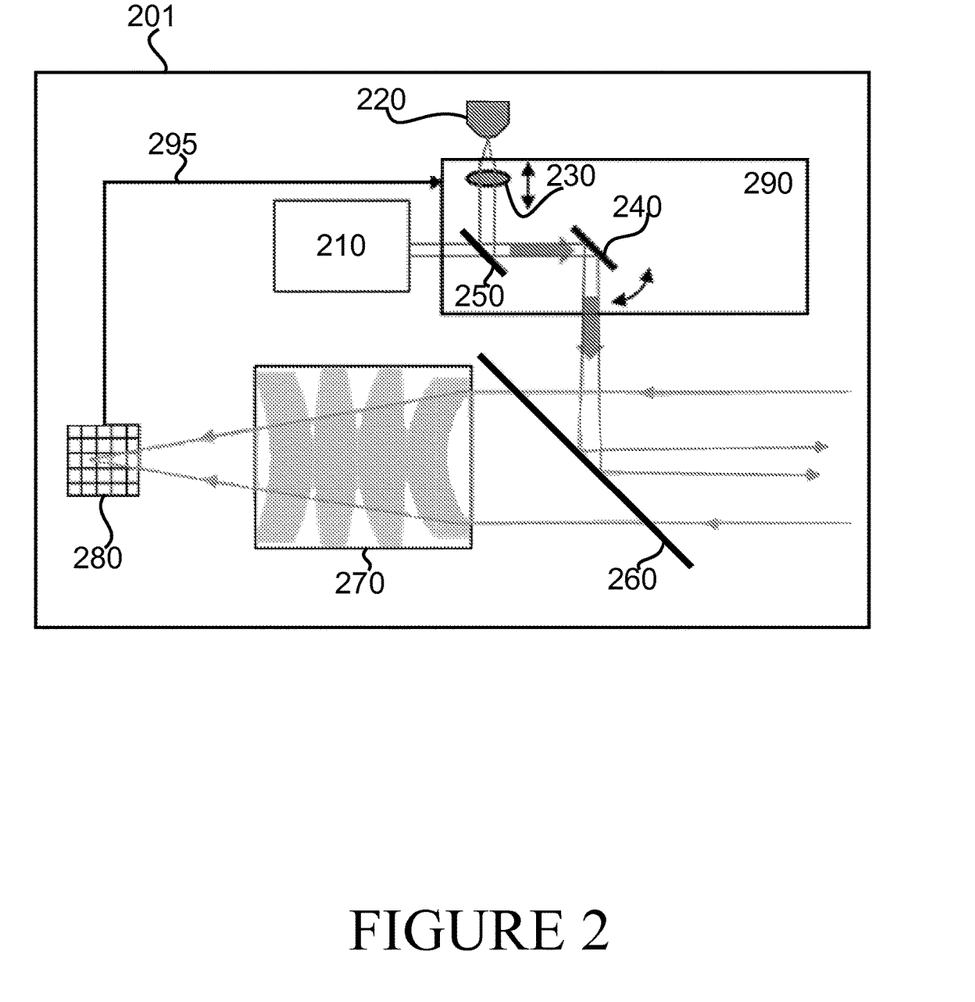
FIG. 2 illustrates a first example structure of a transceiver.

FIG. 2 illustrates a first example structure, of a transceiver 201 on the mobile side. The illustrated transceiver 201 may correspond to transceiver 110 of FIG. 1, for example. Transceiver 201 comprises a light source 220, which may comprise a laser diode, for example. Transceiver 201 may comprise a light emitter 210, such as for example a laser diode, such as for example a quantum key emitter 210, which may comprise, in general, a light emitting component. Transceiver 201 comprises adjustable optical equipment 290, which may comprise, for example, an adjustable lens 230 and an adjustable mirror 240. The adjustable lens 230 may be moved along an axis illustrated in FIG. 2 as a two-way arrow to move it closer to, and further from, light source 220. The adjustable mirror may be tilted along at least one angular degree of freedom. The optical elements, such as lenses or mirrors, comprised in adjustable optical equipment 290 may be actuated by MEMS actuators, for example.

Beam splitter 250 is arranged to reflect light from light source 220 to adjustable mirror 240, and to admit light from quantum key emitter 210 to adjustable mirror 240. Beam splitter 260 is arranged to reflect light from adjustable mirror 240 to outside transceiver 201, and to at least in part admit light arriving into transceiver 201 to lens system 270. A beam splitter, in general, may comprise a half-transparent mirror. Although illustrated as comprised in adjustable optical equipment 290, beam splitter 250 need not be adjustable.

Lens system 270, which may in some embodiments be absent, comprises at least one lens when present. Lens system 270 may comprise a simple lens or an aspheric lens with a suitable diameter and focal length. Lens system 270 may comprise a beam expander and/or it can be a curved mirror or mirror-combination. The lens system illustrated in FIG. 2 is illustrative only, the invention is not restricted to a lens system resembling that of FIG. 2. At a focus position of lens system 270 is disposed position sensitive photodetector 280. Position sensitive photodetector 280, or PSD 280, is configured to determine a location of a light signal thereon. A feedback 295 is arranged from PSD 280 to adjustable optical equipment 290, or at least one optical element comprised in adjustable optical equipment 290. Feedback 295 may physically be arranged between PSD 280 and a control circuitry or processor disposed in transceiver 201 or a device comprising transceiver 201, the control circuitry or processor in turn being arranged to control adjustable optical equipment 290.

In use, light source 220 may be caused to emit, with the adjustable optical equipment, a divergent beam of light from transceiver 201. A user may point the divergent beam to illuminate a server, the server comprising a retroreflector arranged to reflect, at least in part, the divergent beam of light back toward its origin, transceiver 201. Beam splitter 260 admits, at least in part, the reflected light to PSD 280, optionally via lens system 270. The location of a light signal caused by the reflected light on PSD 280 is determined, and adjustable optical equipment 290 is caused to be adjusted via feedback 295, based at least in part on the determined location.

Using information from feedback 295, the adjustable optical equipment 290 adjusts the outgoing beam of light to point the outgoing light toward the source of the reflected light, which corresponds to the direction of the transceiver of the server. In some embodiments, an adaptive process is employed wherein the adjustment of the outgoing beam is observed in PSD 280 to cause a movement of the location of the light signal on PSD 280 caused by the reflected light, until the light signal on PSD 280 caused by the reflected light is on a designated centre part of PSD 280, indicating that the outgoing light is directed toward the server comprising the retroreflector.

Once the outgoing beam of light is directed toward the server, the nature of the outgoing beam of light may be adjusted, by the adjustable optical equipment 290, from a divergent beam to a collimated beam. In this sense, by divergent beam it is meant a beam which diverges by, for example, at least ~2 mrad and by collimated beam it is meant a beam which diverges, for example, less than 0.2 mrad. An example of a collimated beam is a laser beam. The collimated beam, being pointed to the receiving transceiver on the server side, may be used for free-space communication as intercepting communications conducted over such a beam would be difficult. To increase security, the collimated beam may be lowered in intensity toward a single-photon regime. Quantum key emitter 210 may transmit optically encoded information in the collimated beam to the receiving transceiver in the server side, for example in a single-photon regime or close to a single-photon regime. By single-photon regime or close to it is meant a regime where each pulse of light comprised in the beam comprises only one, or at most a few, photons. When quantum key emitter 210 transmits optically encoded information, light source 220 may be inactive. An example of such information is an encryption key, for example for use in symmetric encryption. Once the encryption key has been communicated, the intensity of the collimated beam may be increased and/or light source 220 reactivated to enable high-bandwidth encrypted optical communication between transceiver 201 and the server. Once intensity has been increased, each pulse of light comprised in the collimated beam of light may then comprise a large number of photons and the beam is no longer at or near a single-photon regime.

As communications are ongoing, beam steering may be performed by periodically determining the location of the light signal on PSD 280, and causing adjustable optical equipment 290 to correct any deviation in pointing, to maintain the correct direction of the collimated beam of light outgoing from transceiver 201 so as to fall upon the server. In some embodiments, the beam of light may be modified to become less collimated while higher-bitrate encrypted communications are conducted, to make beam steering easier. The level of collimation may be changed by adjustable optical equipment 290, for example by moving the adjustable lens. An example periodicity for beam steering is 10 000 Hz. Other examples include 1 000 Hz and 30 Hz. Beam steering may be needed in case, for example, a mobile device that comprises transceiver 201 is a smartphone, and a user browses the web using the smartphone, which may entail constant and random movements of the mobile device to be continually corrected by steering the beam.

Figure 3:
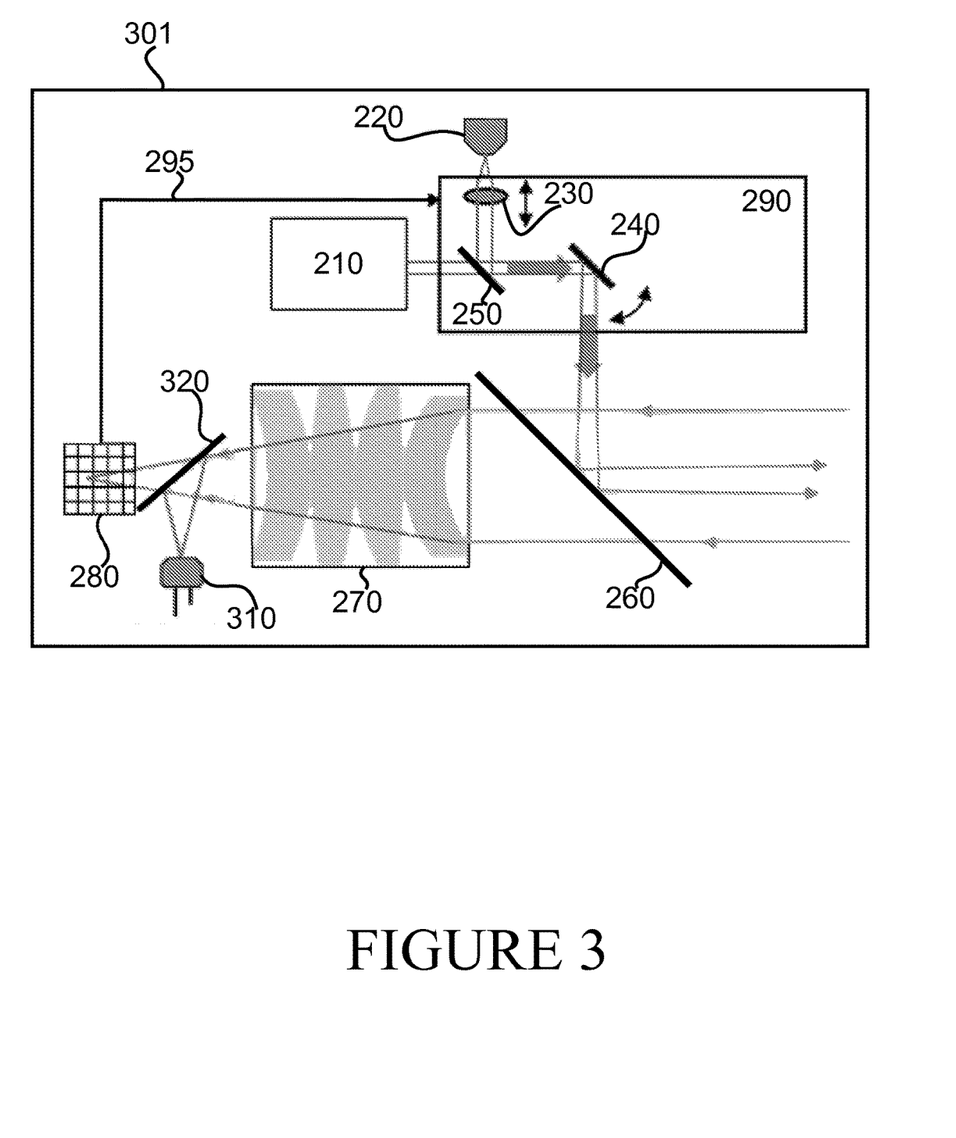
FIG. 3 illustrates a second example structure of a transceiver.

FIG. 3 illustrates a second example structure of a transceiver, on the mobile side. The transceiver 301 of FIG. 3 resembles transceiver 201 of FIG. 2, except in that transceiver 301 further comprises beam splitter 320 and light receiver 310. In FIG. 3, like reference numbers denote like structure as in FIG. 2. Light receiver 310 may comprise, for example, a laser diode receiver. The presence of light receiver 310 enables in the architecture of FIG. 3 faster communication than in the architecture of FIG. 2, since light receiver 310 may be able to react faster than a general PSD 280.

Figure 4:
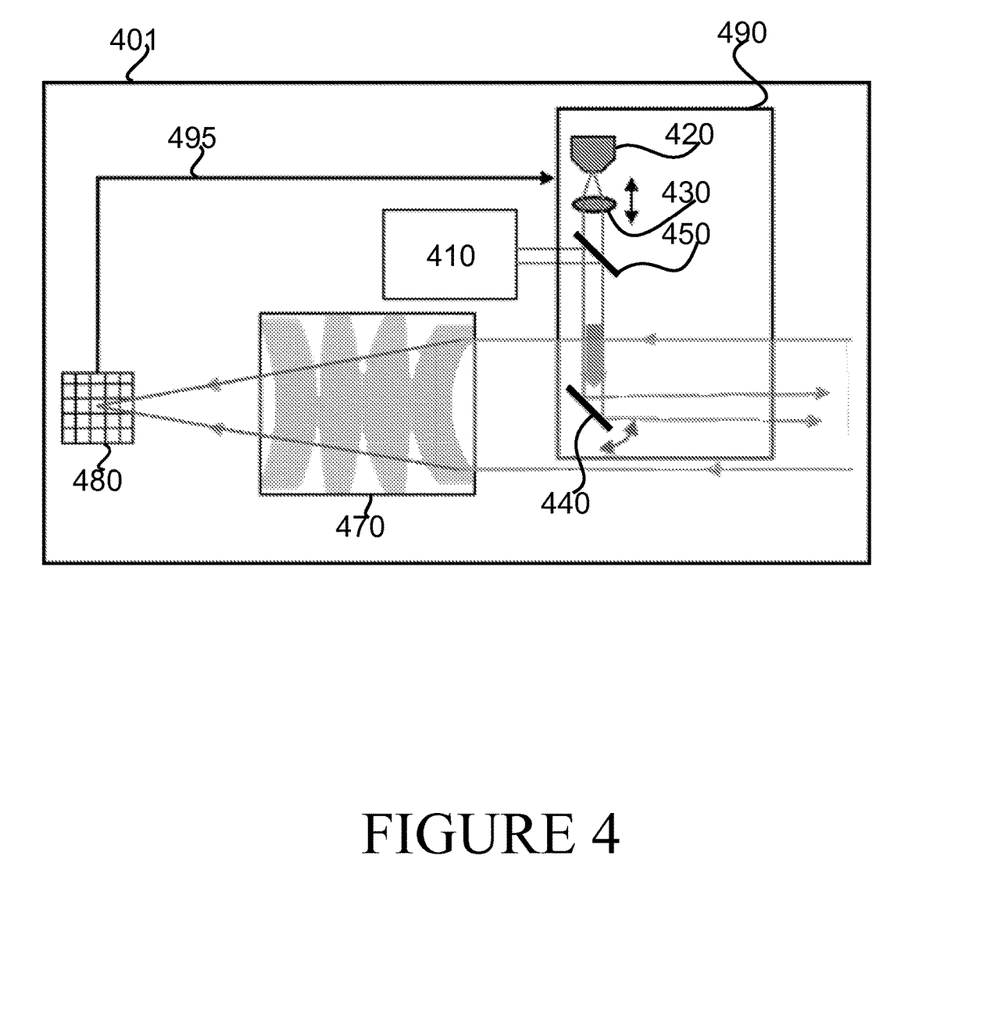
FIG. 4 illustrates a third example structure of a transceiver.

FIG. 4 illustrates a third example structure of a transceiver, on the mobile side. Transceiver 401 comprises a light emitter 420, which may comprise a laser diode, for example. Transceiver 401 may comprise a quantum key emitter 410, which may comprise a light emitting component. Transceiver 401 comprises adjustable optical equipment 490, which may comprise, for example, an adjustable lens 430 and an adjustable mirror 440. The adjustable lens 430 may be moved along an axis illustrated in FIG. 4 as a two-way arrow to move it closer to, and further from, light source 420. The adjustable mirror may be tilted along at least one angular degree of freedom. The optical elements, such as lenses or mirrors, comprised in adjustable optical equipment 490 may be actuated by MEMS actuators, for example.

Beam splitter 450 is arranged to reflect light from light source 420 to adjustable mirror 440, and to admit light from quantum key emitter 410 to adjustable mirror 440. Lens system 470 may focus incoming light to PSD 480. Feedback 495 enables adjustable optical equipment 490 to steer a light beam being emitted from transceiver 401 toward a server, as described above in connection with FIG. 2 and FIG. 3. Although illustrated as comprised in adjustable optical equipment 490, beam splitter 450 need not be adjustable.

Transceiver 401 of FIG. 4 differs from transceiver 201 of FIG. 2 and transceiver 301 of FIG. 3 in that instead of a beam splitter 260 before the lens system, the adjustable mirror 440 is placed there. The adjustable mirror 440 will block a part of light from entering lens system 470, but this is not foreseen to prevent the functioning of the steering via PSD 480. A benefit of eliminating the relatively large beam splitter 260 from the architecture is that adjustable mirror 440 may be smaller, enabling transceiver 401 to be more compact.

Figure 5:
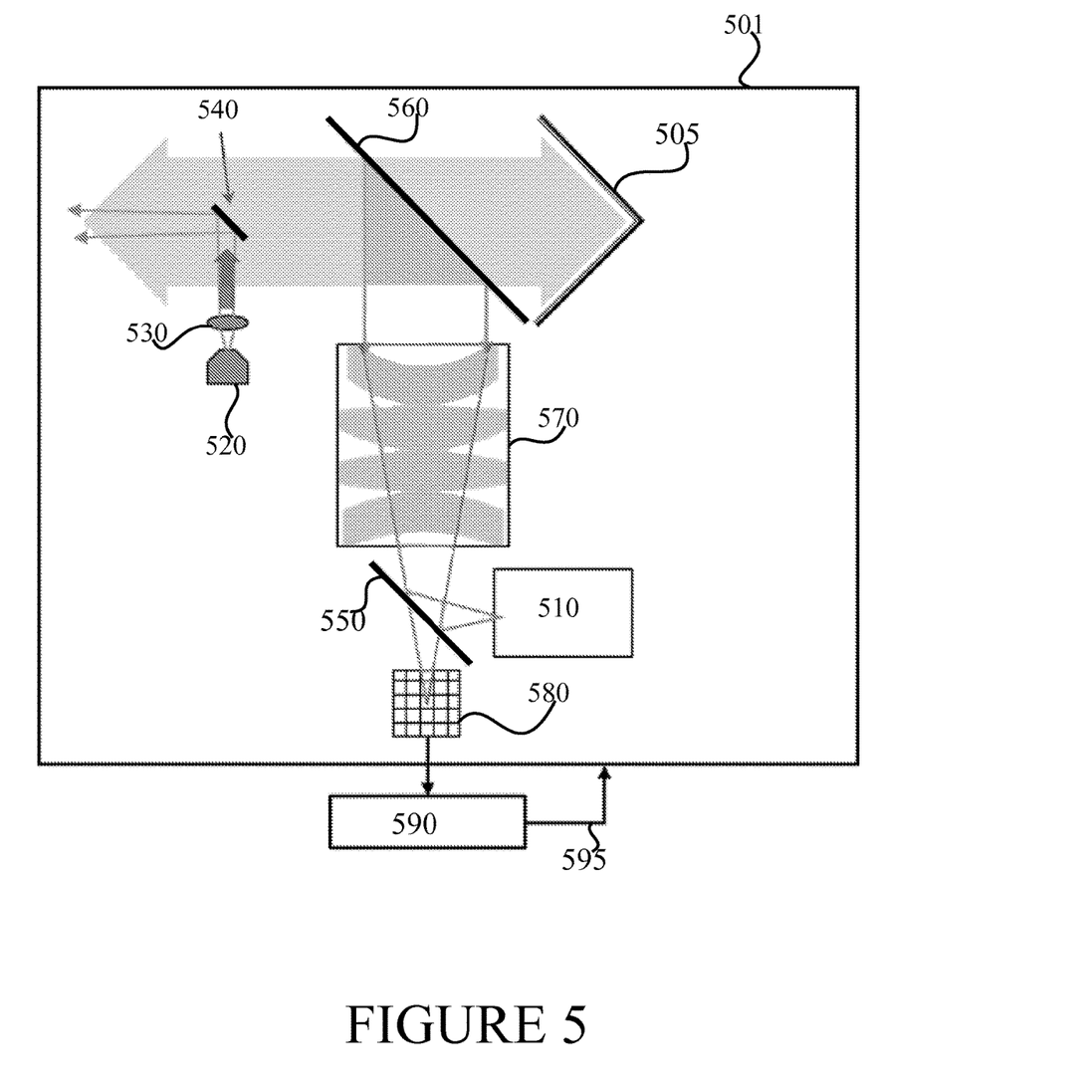
FIG. 5 illustrates a fourth example structure of a transceiver.

FIG. 5 illustrates a fourth example structure of a transceiver, which is on the server side. Transceiver 501 may correspond to transceiver 130 of FIG. 1, for example, that is, transceiver 501 may be disposed, or suitable to be disposed, in a stationary server. FIG. 5 also illustrates tilt actuator mechanism 590, which may correspond to tilt actuator mechanism 132 of FIG. 1, for example.

Transceiver 501 comprises a beam splitter 560 arranged to cause a first part of incoming light to fall on retroreflector 505, and to cause a second part of incoming light to advance toward PSD 580. A lens system 570 may be disposed between beam splitter 560 and PSD 580. Beam splitter 550 may direct part of second part of the incoming light to quantum receiver 510. Quantum receiver 510 may comprise at least one photodetector configured to detect pulses of light, for example pulses at or near a single-photon regime.

Retroreflector 505 reflects incoming light, received via beam splitter 560, back toward a direction of its origin. Retroreflector 505 may comprise, for example, a cat's eye or corner type retroreflector.

In use transceiver 501 is illuminated by a beam of light, such as for example a divergent beam of light, from the mobile device, the incoming beam of light being in part reflected back to the mobile device by retroreflector 505, to thereby enable the mobile device to determine a direction where transceiver 501 is. PSD 580 is configured to determine a location thereon where a light signal caused by the incoming light is, to determine in turn a direction where the transceiver transmitting the beam of light is, from the point of view of transceiver 501. Tilt actuator mechanism 590 is configured to tilt transceiver 501 to point more directly in the determined direction, via mechanical coupling 595. In some embodiments, an adaptive process may be employed wherein it is verified that after the tilting, the light signal on PSD 580 is at a central location, or at least a more central location than before the tilting of transceiver 501. The tilting of transceiver 501 may be configured to occur at a slower rate than the steering of the beam of light in the mobile side transceiver so as to prevent interaction between the steering and the tilting. For example, the tilting of transceiver 501 may take place, for example, 10, 50 or 100 times more slowly than the beam steering in the mobile side transceiver.

Quantum receiver 510 may be configured to receive information, such as for example at least one encryption key, transmitted from the mobile side when the light beam is in collimated, and optionally low-intensity, mode. An example of a low intensity mode is the single-photon regime, or a regime close to the single-photon regime. Once the information has been securely exchanged, communication between transceiver 501 and the transceiver on the mobile side may be secured. Such communication may take place using light source 520, which may comprise a laser diode, for example. Lens 530 and mirror 540 may be employed to transmit light from light source 520 toward a direction of the mobile transceiver.

In some embodiments, sensitive information other than an encryption key is transmitted from the mobile side to the server side. In some embodiments, the server-side element is a receiver rather than a transceiver, in that it may lack the ability to transmit.

Figure 6:
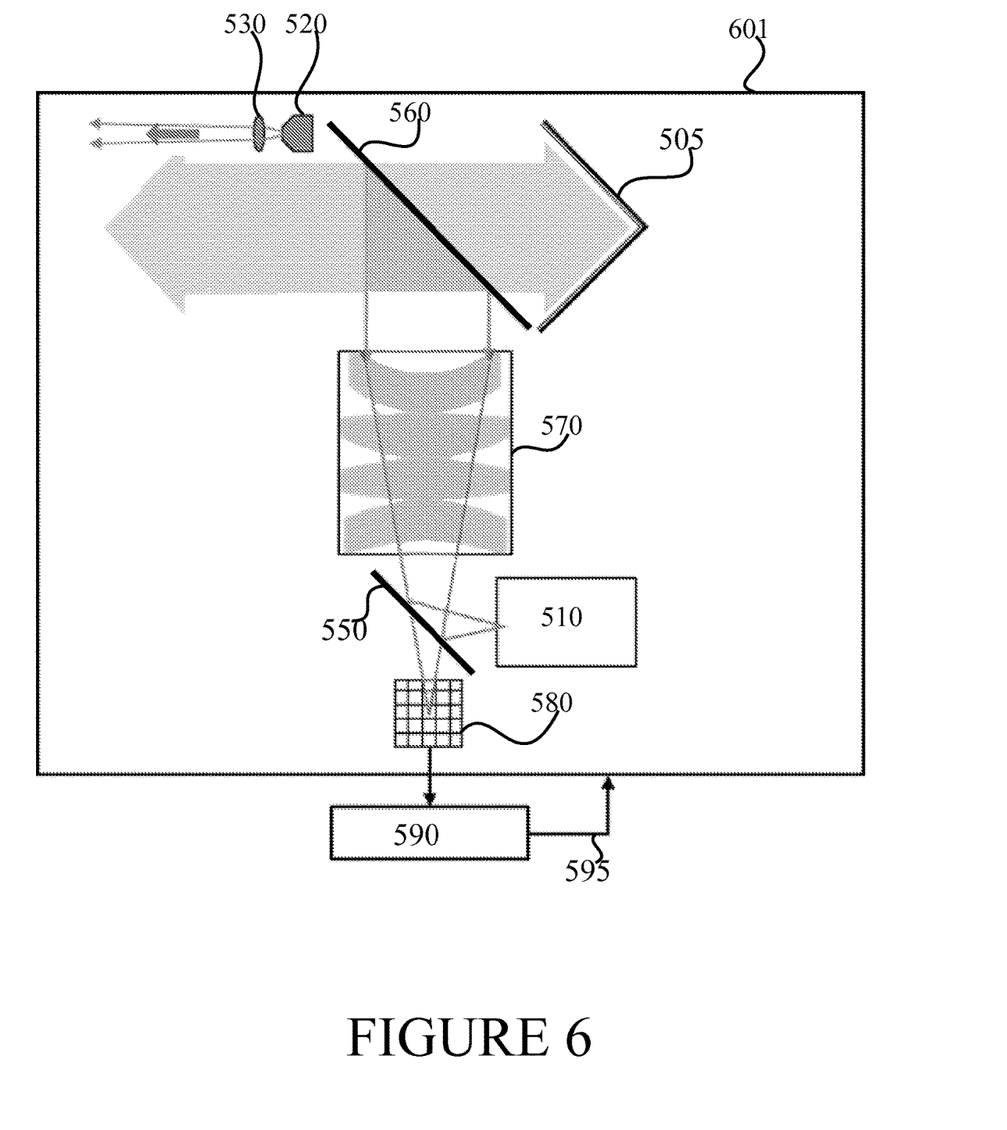
FIG. 6 illustrates a fifth example structure of a transceiver.

FIG. 6 illustrates a fifth example structure of a transceiver, on the server side. Transceiver 601 resembles transceiver 501, except that light source 520 and lens 530 are disposed not in the line-of-sight of the incoming and reflected light beams, but parallel to them. In FIG. 6, like reference numbers denote like structure as in FIG. 5.

Figure 7:
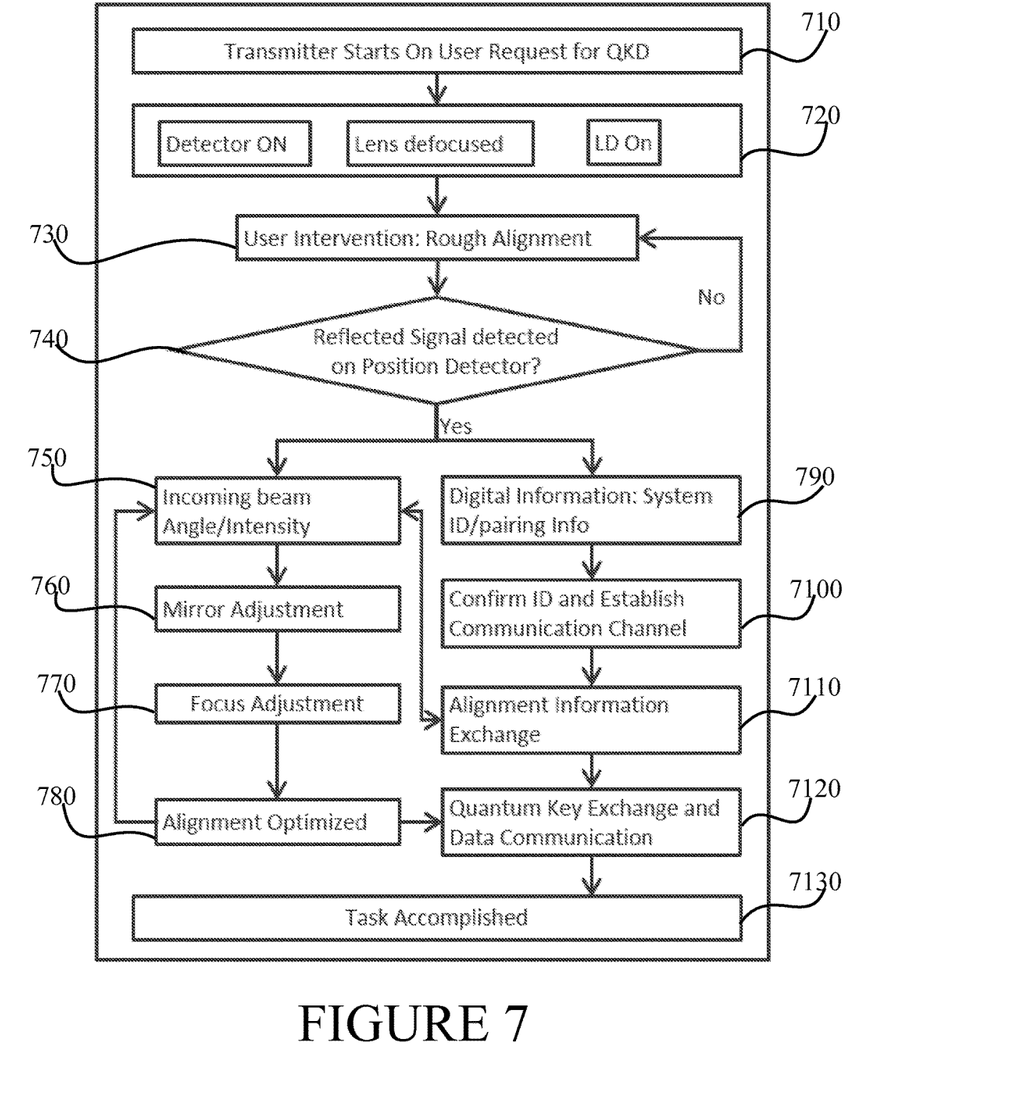
FIG. 7 is a first flow graph of a process in accordance with at least some embodiments of the invention.

FIG. 7 is a first flow graph of a process in accordance with at least some embodiments of the invention. The phases of the illustrated method may take place in a mobile transceiver, for example. Some of the phases may be optional depending on the embodiment. Some phases may occur in a different order than illustrated. Initially, in phase 710, the transmitter is started, for example responsive to a user input. Subsequently, in phase 720, the detector is switched on, the adjustable lens is set to a defocused setting and the light source, for example laser diode, activated.

In phase 730 the user performs a rough alignment by illuminating the server with a divergent beam of light emanating from the transceiver. In phase 740 it is determined whether a light signal is detected on the PSD, indicating retroreflection from the server side. If no, the user needs to make sure the divergent beam of light really does illuminate the server.

If the reflected light signal is detected, processing advances to phases 750 and 790. In phase 790, system pairing is performed with the server. In subsequent phase 7100, a communication channel is established between the transceiver on the mobile side and the transceiver on the server side.

In phase 750, the angle and, optionally, intensity of the incoming reflected beam is determined, for example using the PSD. Using the angle information, adjustment of the adjustable mirror and adjustable lens is performed, in phases 760 and 770, respectively, to align the beam of light. Subsequently, in phase 780, it is determined that the alignment is optimized, in other words the beam of light has been transformed from a divergent beam to a collimated beam. Responsive to this, the key exchange may be performed, phase 7120. Phase 7120 may take place with an intensity of the collimated beam reduced to or near a single-photon regime to increase security. The process ends in phase 7130.

Figure 8:
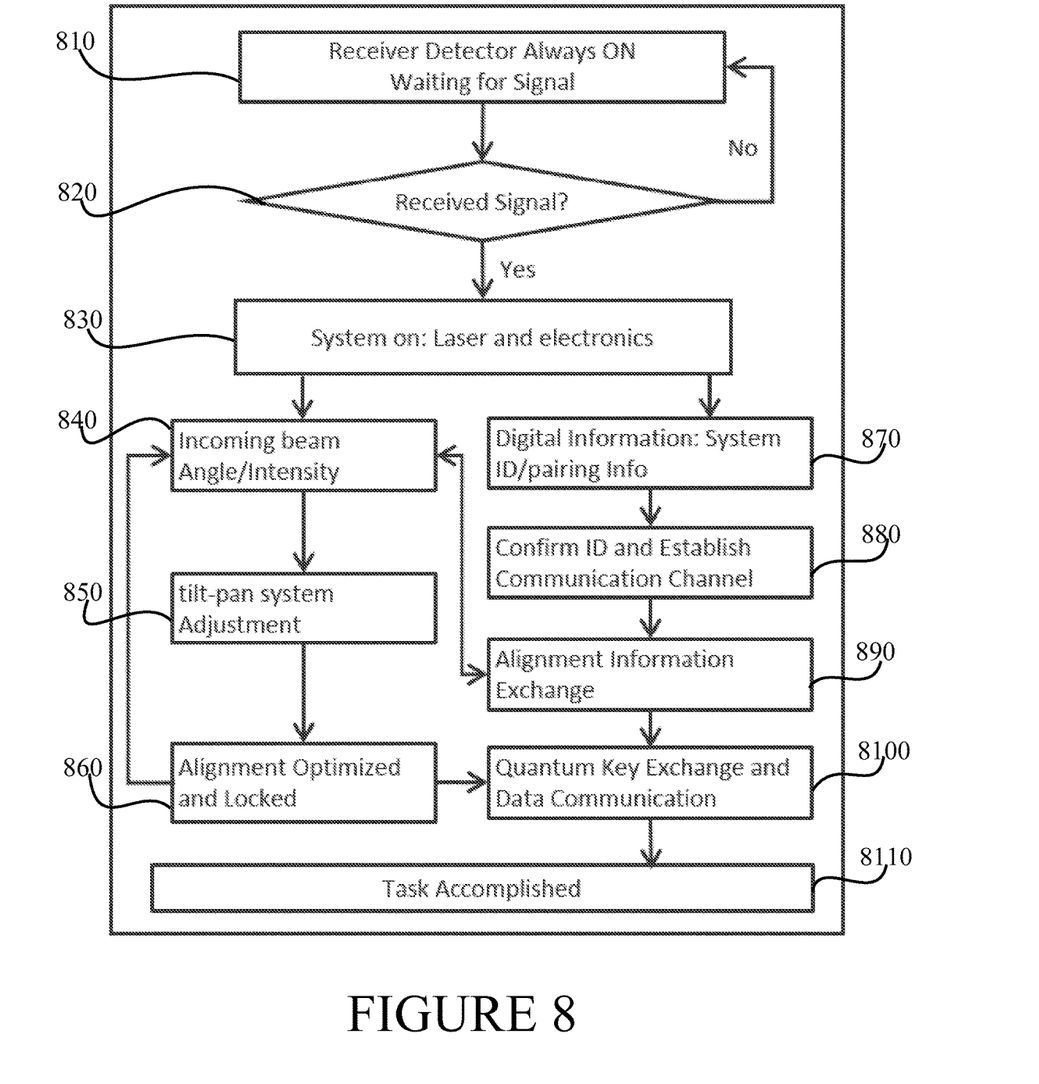
FIG. 8 is a second flow graph of a process in accordance with at least some embodiments of the invention.

FIG. 8 is a first flow graph of a process in accordance with at least some embodiments of the invention. The phases of the illustrated method may take place in a server receiver or transceiver, for example. Some of the phases may be optional depending on the embodiment. Some phases may occur in a different order than illustrated. In phase 810, the receiver is maintained in an active state waiting for a signal. The signal may be monitored for in the PSD 580 and/or quantum receiver 510, for example. Responsive to detection of a signal, processing advances to phase 830 where laser diode and/or electronic systems are switched on.

From phase 830, processing advances to phase 840 and 870. In phase 870, pairing is performed in collaboration with the transceiver on the mobile side. In phase 880, a communication channel may be established with the transceiver on the mobile side. The communication channel may conform to a predefined format or standard, for example.

In phase 840, and and/or intensity is determined for the incoming beam of light. This determination may be performed by the PSD, for example. Based at least in part on the determined angle, tilt actuator mechanism 590 may be employed to tilt the transceiver toward the mobile side transceiver to facilitate communication, phase 850. Once alignment is complete, phase 860, key exchange may be performed with the mobile side transceiver, in detail quantum receiver 510 may receive key information transmitted from the mobile side, in a collimated beam, optionally in or near a single-photon regime. This occurs in phase 8100. The process ends in phase 8110, after which communication may be engaged with the mobile side transceiver, using a high-intensity collimated beam of light and encryption based at least in part on the key information exchanged in phase 8100. In this aspect, a high-intensity beam of light may comprise a beam of light that is not at or near a single-photon regime, that is, a pulse of light comprised in the beam may comprise a large number of photons.

In general, receiver and/or transceiver as described hereinabove may comprise control circuitry, such as for example a processor, which may comprise, for example, a single- or multi-core processor wherein a single-core processor comprises one processing core and a multi-core processor comprises more than one processing core. A processor may comprise a Qualcomm Snapdragon 800 processor, for example. A processor may comprise more than one processor. A processing core may comprise, for example, a Cortex-A8 processing core manufactured by Intel Corporation or a Brisbane processing core produced by Advanced Micro Devices Corporation. Control circuitry and/or a processor may comprise at least one application-specific integrated circuit, ASIC. Control circuitry may comprise at least one field-programmable gate array, FPGA. A processor and/or control circuitry may be means for performing method steps in a transceiver. A processor or control circuitry may be configured, at least in part by computer instructions, to perform actions.

A transceiver may comprise memory. Memory may comprise random-access memory and/or permanent memory. Memory may comprise at least one RAM chip. Memory may comprise magnetic, optical and/or holographic memory, for example. Memory may be at least in part accessible to a processor and/or control circuitry. Memory may be mean for storing information. Memory may comprise computer instructions that control circuitry is configured to execute. When computer instructions configured to cause control circuitry to perform certain actions are stored in memory, and a device overall is configured to run under the direction of the control circuitry using computer instructions from memory, the control circuitry and/or its at least one processing core may be considered to be configured to perform said certain actions.

A processor or control circuitry may be furnished with a transmitter arranged to output information therefrom, via electrical leads internal to a device, to other devices comprised in the device. Such a transmitter may comprise a serial bus transmitter arranged to, for example, output information via at least one electrical lead to memory for storage therein. Alternatively to a serial bus, the transmitter may comprise a parallel bus transmitter. Likewise a processor or control circuitry may comprise a receiver arranged to receive information, via electrical leads internal to the device, from other devices comprised in the device. Such a receiver may comprise a serial bus receiver arranged to, for example, receive information via at least one electrical lead for processing. Alternatively to a serial bus, the receiver may comprise a parallel bus receiver.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A handheld apparatus comprising:
   a light source configured to emit a beam of light;
   adjustable optical equipment actuated by microelectromechanical actuators, wherein the adjustable optical equipment comprises an adjustable lens and an adjustable mirror, wherein the adjustable lens is adjustable along an axis along which the beam of light propagates in order to change a level of collimation, and wherein the adjustable mirror is configured to be tilted along at least one angular degree of freedom to control a direction of the beam of light output by the apparatus;
   a position sensitive photodetector;
   at least one light emitter, and
   control circuitry configured to cause the at least one light emitter and the adjustable optical equipment to output from the apparatus a divergent beam of light, to receive feedback from the position sensitive photodetector and determine a location of a light signal on the position sensitive photodetector and to cause at least one of the at least one light emitter and the adjustable optical equipment to output from the apparatus a collimated beam of light following adjustment of the adjustable lens to a direction established by the tilting of the adjustable mirror that is selected based at least in part on the location of the light signal on the position sensitive photodetector.

2. The apparatus according to claim 1, wherein the adjustable equipment further comprises a lens system configured to direct the light signal to the position sensitive photodetector.

3. The apparatus according to claim 1, wherein the light signal is focused on the position sensitive photodetector by a lens system comprised in the apparatus.

4. The apparatus according to claim 1, wherein the at least one light emitter comprises at least one laser diode.

5. The apparatus according to claim 1, wherein the apparatus further comprises a beam splitter arranged to direct outgoing light from the adjustable mirror to a first direction, and to admit light arriving from the first direction to proceed toward the position sensitive photodetector.

6. The apparatus according to claim 3, further comprising a beam splitter arranged between the lens system and the position sensitive photodetector, arranged to cause light from the lens system to illuminate the position sensitive photodetector and a second photodetector.

7. The apparatus according to claim 1, wherein the adjustable mirror is arranged to reflect light arriving from the adjustable lens to a first direction, and the apparatus is configured to allow light arriving from the first direction, arriving at the apparatus, to in part pass the adjustable mirror to proceed toward the position sensitive photodetector.

8. The apparatus according to claim 1, wherein the at least one light emitter comprises a quantum key emitter configured to transmit optically encoded key information in the collimated beam of light, via the adjustable optical equipment.

9. An apparatus comprising:
   an optical receiver comprising a beam splitter, a retroreflector, a lens system and a position sensitive photodetector, wherein the beam splitter is configured to cause a first part of incoming light to be directed to the retroreflector and a second part of the incoming light to be directed through the lens system to the position sensitive photodetector, wherein the retroreflector is configured to reflect the first part of the incoming light back toward its origin and the position sensitive photodetector is configured to determine a location of a light signal caused by the second part of the incoming light thereon,
   a tilt actuator mechanism based on microelectromechanical actuation configured to tilt the optical receiver based at least in part on the location of the light signal on the position sensitive photodetector; and
   control circuitry configured to cause the tilt actuator mechanism to tilt the optical receiver based at least in part on the location of the light signal on the position sensitive photodetector.

10. The apparatus according to claim 9, the apparatus further comprising a light emitter configured to emit light from the apparatus to enable line-of-sight optical communication.

11. The apparatus according to claim 9, the optical receiver further comprising a quantum receiver configured to receive quantum key information encoded in light arriving in the optical receiver.

12. A method, comprising:
   causing at least one light emitter and an adjustable optical equipment to output from an apparatus a divergent beam of light, wherein the adjustable optical equipment comprises an adjustable lens and an adjustable mirror, wherein the adjustable lens is adjustable along an axis along which the beam of light propagates in order to change a level of collimation, and wherein the adjustable mirror is configured to be tilted along at least one angular degree of freedom to control a direction of the beam of light output by the apparatus;
   receiving feedback from a position sensitive photodetector and determining a location of a light signal on the position sensitive photodetector, and
   causing the at least one light emitter and the adjustable optical equipment to output from the apparatus a collimated beam of light, using the adjustable optical equipment actuated by microelectromechanical actuators in order to adjust the adjustable lens so as to change the level of collimation, to a direction established by the tilting of the adjustable mirror that is selected based at least in part on the location of the light signal on the position sensitive photodetector.

13. The method according to claim 12, wherein the at least one light emitter comprises a quantum key emitter, and wherein the method further comprises causing the quantum key emitter to transmit, via the adjustable optical equipment, optically encoded quantum key information in the collimated beam of light.

14. The method according to claim 12, wherein the light signal comprises a reflection of the divergent beam of light.

15. A method, comprising:
- receiving incoming light at an optical transceiver and splitting the incoming light so as to cause a first part of incoming light to be directed to a retroreflector and a second part of the incoming light to be directed through a lens system to a position sensitive photodetector;
- reflecting the first part of the incoming light from the retroreflector back toward its origin;
- determining a location of a light signal caused by the second part of the incoming light on the position sensitive photodetector, and
- tilting, using a tilt actuator mechanism based on microelectromechanical actuation and controlled by control circuitry, the optical transceiver based at least in part on the location of the light signal on the position sensitive photodetector.

16. The method according to claim 15, further comprising receiving, in a quantum receiver comprised in the optical transceiver, quantum key information encoded in light arriving in the optical transceiver.

\* \* \* \* \*